United States Patent [19]
Tang

[11] Patent Number: 5,350,505
[45] Date of Patent: Sep. 27, 1994

[54] PLASTIC MEDIA FILTER

[75] Inventor: Nianfa Tang, Richmond, Hts., Ohio

[73] Assignee: Jet, Inc., Cleveland, Ohio

[21] Appl. No.: 24,433

[22] Filed: Mar. 1, 1993

[51] Int. Cl.$^5$ ............................................. B01D 24/46
[52] U.S. Cl. ...................................... 210/108; 210/121;
210/136; 210/138; 210/143; 210/151; 210/266;
210/275; 210/277; 210/290
[58] Field of Search ............... 210/150, 151, 108, 121,
210/123, 136, 138, 143, 266, 269, 275, 277, 290

[56] References Cited

U.S. PATENT DOCUMENTS

| | | | |
|---|---|---|---|
| 293,745 | 2/1884 | Hyatt | 210/290 |
| 3,471,025 | 10/1969 | Dobson | 210/290 |
| 3,741,390 | 6/1973 | Wallace et al. | 210/108 |
| 3,814,247 | 6/1974 | Hirs | 210/80 |
| 3,817,378 | 6/1974 | Ross | 210/108 |
| 4,118,322 | 10/1978 | San Roman | 210/136 |
| 4,197,205 | 4/1980 | Hirs | 210/275 |
| 4,246,119 | 1/1981 | Alldredge | 210/279 |
| 4,322,299 | 3/1982 | Scholten et al. | 210/290 |
| 4,422,929 | 12/1983 | Owens | 210/108 |
| 4,454,034 | 6/1984 | Astrom et al. | 210/108 |
| 4,692,248 | 9/1987 | Stannard et al. | 210/403 |
| 4,747,945 | 5/1988 | Kreusch et al. | 210/290 |
| 4,818,420 | 4/1989 | Mims | 210/108 |
| 4,851,122 | 7/1989 | Stanley | 210/501 |
| 4,906,381 | 3/1990 | Barbaro | 210/660 |

Primary Examiner—Peter A. Hruskoci
Attorney, Agent, or Firm—Jon L. Roberts; Thomas M. Champagne

[57] ABSTRACT

A filter for removal of biochemical oxygen demand and suspended solids utilizing multi-layer filtration media. The filter media includes plastic particles, sand, and garnet and is operated under an automatic control condition. Fine filtering is accomplished by a sludge cake which develops at the upstream face of the filter media. For cleaning the filtration media, deposited sludge is removed from the filter bed by backwashing in a short time period at a high strength backwash flow rate.

38 Claims, 7 Drawing Sheets

PLASTIC MEDIA FILTER

BACKGROUND OF THE INVENTION

I. Field of the Invention

The present invention generally relates to filter systems for the treatment of wastewater and potable water. In particular, the filter system of the present invention comprises a vessel containing multiple filter media situated in layers. The system utilizes a downflow filter technique including a periodic backflow process.

II. Background and Description of the Related Art

Home treatment plants are extensively used to treat wastewater discharged from houses which are far from city sewer systems. In fact, each minute, 4.2 million gallons of wastewater are discharged from home treatment plants in the United States alone. The effluent quality of wastewater from home treatment plants is evaluated using four parameters: dissolved oxygen ("DO"), pH, biochemical oxygen demand ("BOD") and suspended solids ("SS"). Treated wastewater must meet certain required acceptable tolerance ranges which are set forth in typical secondary effluent standards such as the Class I discharge standard of National Sanitation Foundation ("NSF") International. Usually, pH and DO requirements are easily achieved, and an upflow or downflow gravel filter is used as the last process to remove BOD and SS in some home treatment plants. However, many gravel filters are only backwashed after several months of service. Absent such backwashing, medial clogging problems can occur, resulting in inconsistent effluent quality. Similar filtering methods are used to treat effluent from commercial plants. However, poor maintenance of such systems also results in similar problems, leading to poor effluent quality.

In wastewater treatment applications in particular, the presence of suspended solids is frequently a major process problem. Filtration has commonly been employed to remove suspended solids from wastewater. Filtration normally occurs as the third step in a tertiary treatment process, following processing in a settling tank and a biofilm degradation process. Although traditional sand and mixed media filters are generally effective in removing suspended solids, the filtration bed is susceptible to clogging and high pressure drops across the bed. As a result, sand and mixed media filters require a manually controlled backwash procedure to clear accumulated solids.

Based upon the above problems, new types of filters have been developed, such as the filtration bag, the filtration sock, and polyurethane media and synthetic media filters. However, the filtration bag and sock require periodic replacement. Further, other filters are not suitable for home plants, which operate automatically and are inspected only once every six months. An invention that addresses the clogging problem is described in U.S. Pat. No. 4,906,381 to Barbaro, which discloses a fluid filtration unit comprising a number of filter modules. Each module has a pressure release valve. When a particular module becomes clogged with solids filtered from the fluid, the release valve allows that module to be bypassed and the fluid passes to the next unclogged module.

Recently, granular plastic media have been used as filtration media, but some types of plastic media are used only under gravity backwash conditions. If these media are used in a pump backwash system, the plastic media is coagulated into large particles by electrostatic force. This coagulation adversely affects backwash and filtration efficiencies.

Past attempts at filtering suspended solids in sand filters involved some manner of arranging the orientation of filtration media by placing the finer sand on the bottom and the larger grained sand on the top. This arrangement is contrary to that of a rapid sand filter, in which the finer grained sand is layered atop the larger grained sand. By using this arrangement in a downflow filter, much of the filter clogging experienced with the rapid sand filter can be prevented. The larger sand traps large solids, allowing finer particulate matter through to be filtered by the fine sand. The problem with such an arrangement has been that of maintaining the orientation of fine sand at the bottom and large sand at the top during backwashing. Upon backwashing, the larger sand particles tend to settle to the bottom so that resulting orientation is almost equivalent to the orientation of an ordinary rapid sand filter, that is, the larger grained sand settles to the bottom and the finer sand to the top. In practical application, anthracite particles and sand are used in double layer media filters because the specific gravity of the anthracite particles is less than that of the sand although the anthracite particles are larger. The anthracite particles therefore settle atop the sand after backwashing, and the desired media layering is maintained. The structure of the anthracite particles is too fragile to last through a long operation period, however. The problem of losing the anthracite particle media during backwashing is a significant disadvantage of this process.

Some of the above problems have been addressed by other inventions. For example, U.S. Pat. No. 3,814,247 to Hirs discloses a filter system using two granular filter media layers. The top media layer is composed of a course grained material. The layer beneath this is composed of a finer grained material having a specific gravity that is greater than that of the material above it. Synthetic as well as natural materials are disclosed as possible filter media for the upper layer. Backwashing of the lower layer is accomplished in the usual manner whereas the upper layer undergoes a more violent agitation and slurrying in a flow path external to the filter vessel. Frequent backwashing in this manner is performed in order to avoid a buildup of suspended solids at the face of the upper filtration medium.

U.S. Pat. No. 4,197,205 to Hirs discloses a filter system using a number of granular filter media layers. The top media layer is composed of a course grained material. The layers beneath this are composed of progressively finer grained materials having specific gravities that become progressively greater than that of the material above it. At least one layer is composed of a synthetic material. The layers are arranged in this fashion in order to reduce the occurrence of surface plugging.

U.S. Pat. No. 4,246,119 to Alldredge discloses an upflow or combination upflow/downflow filter system using a number of filter media layers. The filter media are compressed between two flexible diaphragms, one located above the filter media and one below. In the upflow configuration, finer filter media are layered on courser media. In the combination upflow/downflow configuration, a fine grained filter medium is packed between two courser media layers.

U.S. Pat. No. 4,692,248 to Stannard et al. discloses a filter apparatus which filters material from influent through a solid filter medium. A filter cake which forms on the surface of the solid filter medium is continuously washed away in the disclosed process utilizing the apparatus.

U.S. Pat. No. 4,851,122 to Stanley discloses a filter apparatus utilizing five layers of filtration media. The water to be treated first encounters an activated charcoal layer, used as a bacterial-reducing agent. Three successive layers of resin based media then remove impurities from the water. Finally, a layer of filtration medium such as crushed quartz, having a particle size much greater than that of the resin layers, removes sediment from the water.

None of the above inventions addresses nor solves the problems of filter efficiency or head loss over long periods of use. Head loss is the height difference between the water level in a fluid treatment plant and the treatment plant outlet. Head loss during the filtration cycle should be minimized for efficient water treatment. Initially, head loss during a filtration process is caused by the resistance of the filtration media themselves. As the media become clogged with impurities, it is this resulting sludge which increases the head loss of the system. Backwashing alleviates the head loss problem, but inefficient backwashing and clogged filter media following the backwash process increase head loss over the course of the wastewater treatment operation.

Those inventions which use synthetic filter media still have the problem of media coagulation following backwash. Loss of natural media through long term use and vigorous backwash continues to be a problem. The disclosed processes are not suited to automatic operation, especially operation including an effective backwash procedure, nor are the systems easily maintainable.

Faced with the foregoing difficulties in the application of conventional filters and new types of filters, the new multi-media filter of the present invention has been developed to improve filtration efficiency and head loss across the media, and eliminate the media loss problem.

It is therefore an object of the present invention to provide a filter for tertiary treatment of municipal wastewater which possesses the advantages of high filtration efficiency and easy maintenance.

It is a further object of the present invention to set up a media layer arrangement which has the largest grained filter medium on the top and the finest grained filter medium on the bottom, exactly the opposite of the rapid sand orientation.

It is another object of the present invention to use anti-electrostatic granular plastic media, which has a long practical life and does not affect filtration and backwash efficiency.

It is a further object of the present invention to provide an automatic filtration and backwash control system which does not need any manual control at all, and is inexpensive and simple to use.

It is yet another object of the present invention to provide a filter which will achieve the Class I discharge standard of NSF International.

SUMMARY OF THE INVENTION

The present invention comprises a holding tank packed with triple-layer filter media. The influent containing suspended solids is flowed through a check valve, top screen, and filter bed, which consists of anti-electrostatic plastic media, sand, and garnet. The filtered fluid is then flowed through a bottom screen, a collection and distribution pipe, and a backwash pump. Mechanical straining occurs when the sludge particles in the influent are larger than the pores of the filtration media. At the beginning of the filtration period, large particles and bulked activated sludge are removed at the top of the plastic media layer and fine particles of activated sludge are removed at the top of the sand layer. Straining occurs at the top of the plastic media layer after a "sludge cake" develop on the top of the filtration bed. This cake consists entirely of particles strained from the influent. Consequently, the pores in the cake are generally smaller than the particles in the influent which formed it. New particles are continuously added to the upstream face of the sludge cake, and the cake gradually thickens. Particle removal is now accomplished by the cake itself. The original filtration bed merely acts as a support for the cake. The cake removes particles from the influent by mechanical straining and flocculation at its upstream face.

The treatment provided by the filter is not only mechanical straining and physical entrapment, but also biofilm degradation. Usually, the influent is aerobic, containing certain concentrations of DO and biomass, and its effect in the filter is to promote the growth of aerobic bacterial film on the surface of the filter media. BOD in the flow is removed, accompanying SS removal and the biofilm degradation process.

Because the anti-electrostatic plastic particles are not worn out in a short period, the filtration head loss is low and sludge removal capacity is high. The plastic media can also be fluidized easily during backwashing. Unlike some curently used filters which utilize anthracite as a filter medium, the present invention utilizes plastic particles, which are man-made and therefore can be manufactured to a uniform size. Further, these particles do not wear out as do anthracite particles, which occur naturally and therefore do not have an optimal uniformity coefficient.

During backwashing, backwash fluid in the effluent holding tank is pumped into the filter through the backwash pump, collection and distribution pipe, bottom screen, filtration bed, top screen and backwash outlet. The check valve on the influent line is closed by hydraulic force, and the backwash effluent is forced to flow out through a backwash effluent line. The media undergoes fluidization between top and bottom stainless steel screens during this backwash process. The sludge cake and particles accumulated in the filtration bed are washed out from the filter in a short time. After backwashing, the media settle down in order, and the resulting syphon phenomenon is broken by a hole in the effluent line, which always assures the media remains submerged in the liquid. The filter bed is then reset and the filtration process is resumed.

DETAILED DESCRIPTION OF THE INVENTION

Figure 1:
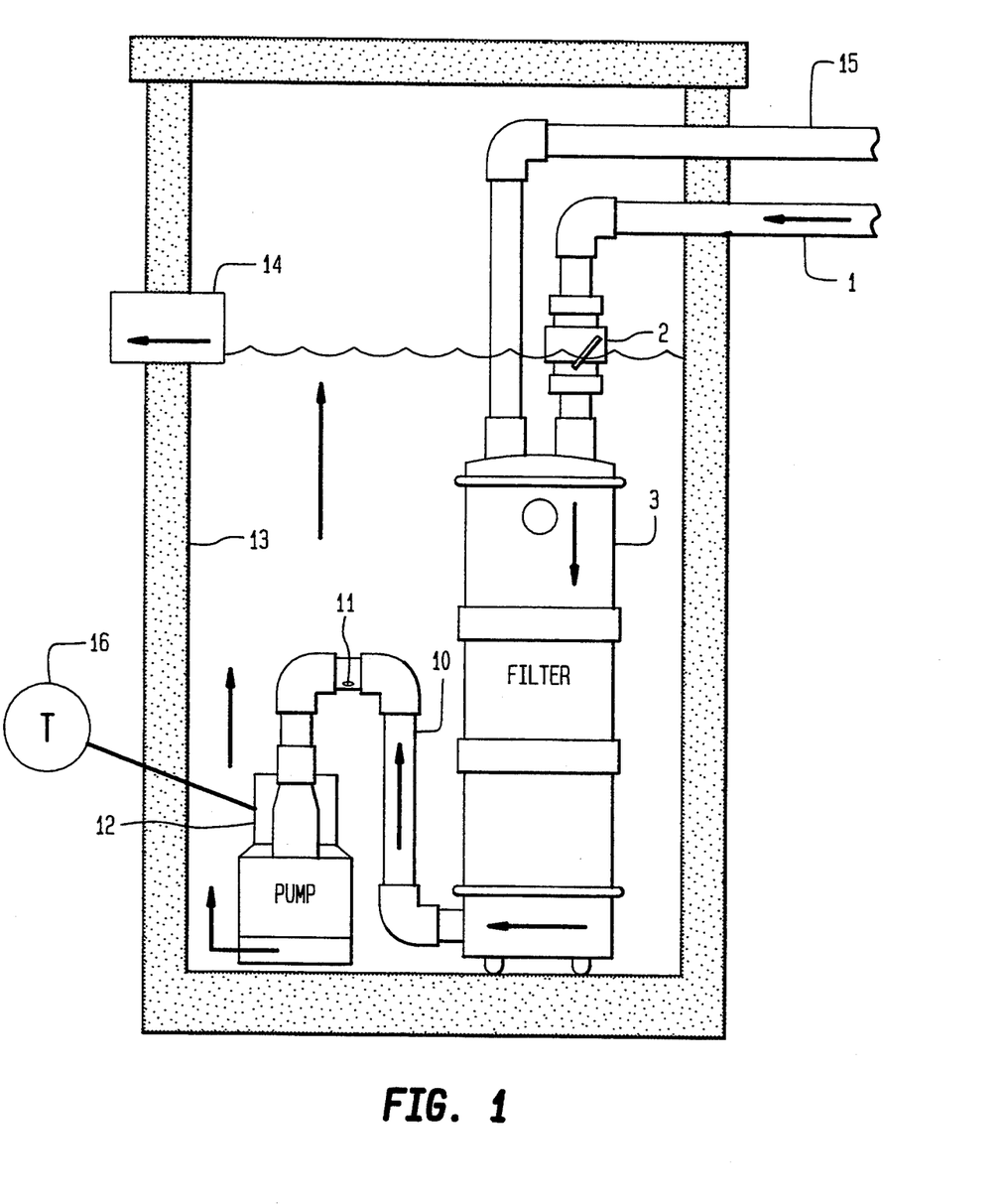
FIG. 1 is a schematic diagram of the filter assembly in operation showing fluid flow.

Referring to FIG. 1, the filtration system is shown. Influent liquid containing certain concentrations of BOD and SS enters the filtration system via influent line i having check valve 2, which is open during the filtration phase operation. This influent liquid may be derived from a variety of sources. For example, a biological treatment plant effluent having 35–80 parts per million SS or river water for a municipal potable water treatment facility may be inputs to the system. Alternatively, the liquid could comprise raw water intended for boilers or for internal industrial plant use. From influent line 1, the liquid enters a closed container, filter vessel 3. The filter vessel 3 is located within a larger closed container, referred to as the backwash water holding tank 13. Alternatively, the filter vessel 3 may be placed beside the backwash water holding tank 13 rather than inside it, or the two may be placed remote from each other. They may then be connected by a hole, pipe, channel, or other effluent line. The filter vessel 3 may suitably be constructed from any rigid non-porous material. Suitable materials for construction of the filter vessel 3 include PVC or polyethylene or other types of plastic structure material, as well as steel and concrete. The filter vessel 3 is only partially filled with filtration media. The filter vessel 3 has an influent inlet and backwash outlet at the top, and a collection and distribution outlet at the bottom. One stainless steel screen is installed at the top to prevent media loss during backwash, and another screen at the bottom to support the filtration media.

In the preferred embodiment, the hydraulic loading of the filter is desirably maintained between 1 and 6 gal./min./ft.$^2$ and the filtration period lasts between 3 and 24 hours, the exact values to be determined by the amount of hydraulic loading, influent SS loading and filtration-allowed head loss. The effluent from the filter passes through the backwash water holding tank 13. The effluent rises to the level of an outlet port, tank outlet 14, which channels the overflow effluent to receiving waters of other treatment facilities, or elsewhere to be made available for other uses. The amount of water that remains in the backwash water holding tank 13 is available for use during the backwash process, and occupies the net effective volume of the backwash water holding tank 13, which is between 15 and 60 gallons.

Another option available is to introduce a lift station next to the backwash water holding tank 13. The lift station tank may be designed as a separate tank or as a combination tank including the backwash water tank. The lift station may be necessary to pump effluent from the backwash water holding tank 13 when the filter is located below ground level or below the level of the receiving waters of subsequent treatment facilities.

During the backwash step, the liquid in the backwash water holding tank 13 is pumped into filter vessel 3 by backwash pump 12. See FIG. 2. In the backwash step, the check valve 2 is closed by backwash water pressure, and the backwash effluent is flowed through backwash effluent line 15 to a treatment facility such as a primary settling tank or an aeration tank. In larger filters such as those used in commercial applications, the backwash effluent line 15 may be a large effluent open channel. The backwash process may be controlled automatically by either a cycle timer 16 or a float switch 20.

Figure 2:
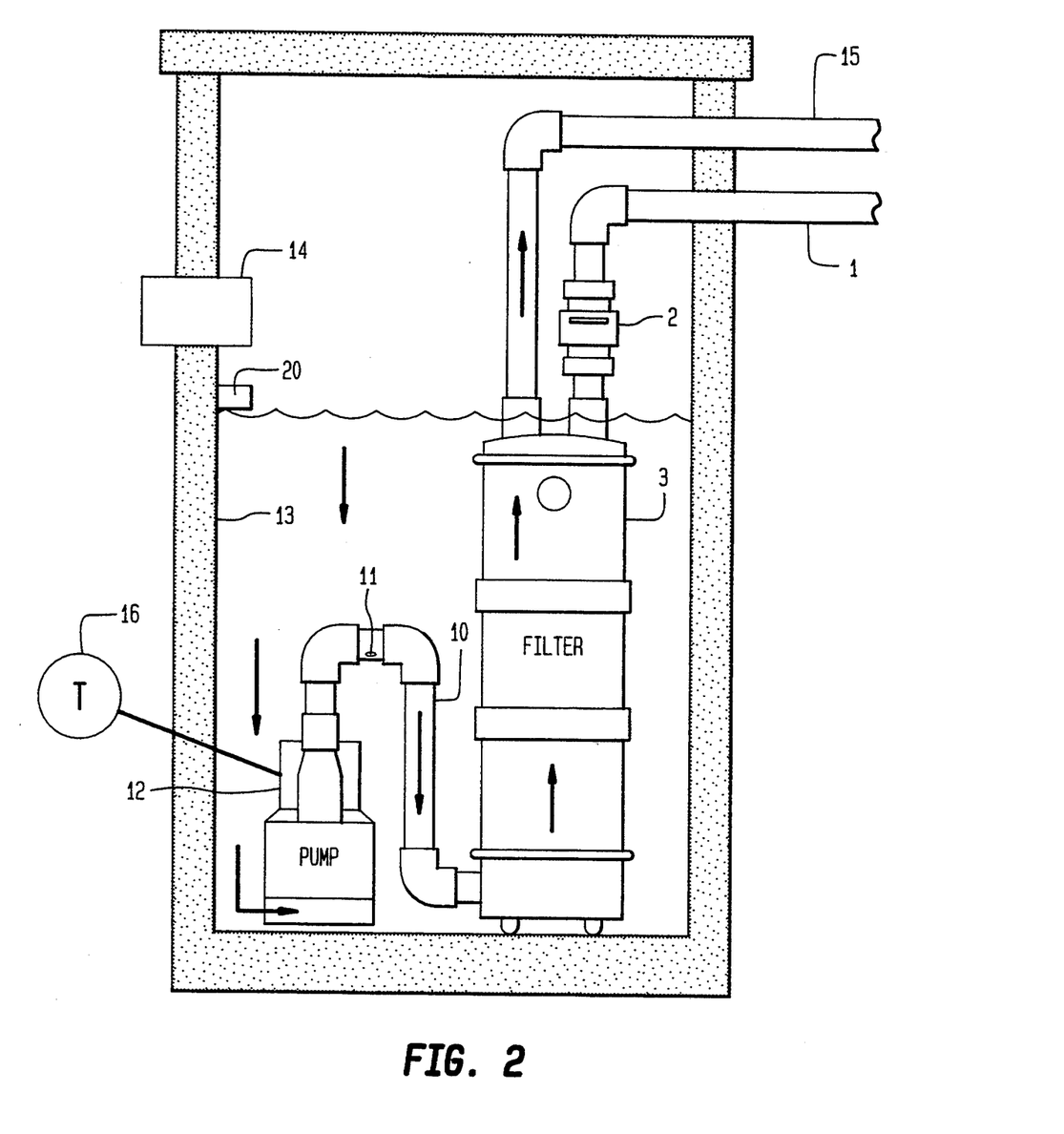
FIG. 2 is a schematic diagram of the filter assembly during the backwashing process.

After the backwash step is terminated, the backwash water remaining in the filter flows out effluent line 10 by gravity flow force which causes a syphon phenomenon. The syphon phenomenon is broken by an anti-syphon hole 11, which provides a passage for fluid between the inside of the effluent line 10 to the backwash water holding tank 13. The water line in the filter vessel 3 is kept at the same level as the anti-syphon hole 11. The filtration media is always kept submerged under liquid by using the anti-syphon hole 11 to break the syphon phenomenon. If the anti-syphon hole 11 were not present, the liquid would all be drawn out of the filter vessel 3 following the backwash procedure, and the filter media would be dried, which would adversely affect the filtration efficiency. Once the level of the liquid in the filter vessel is lowered by gravity flow, the check valve 2 is automatically opened by the influent hydraulic pressure. Now the filter can begin a new filtration portion of the cycle.

The backwash water added to the filtration vessel 3 in the backwash step may contain suspended solids which consist of fine sludge particles passed through the filtration media and flocculated in the backwash water holding tank 13. The solids are introduced to the filter vessel 3 at the beginning of the backwash step. Even though there are some solids still remaining in the backwash water holding tank 13 after filtration, filter performance and filtrate quality are not affected.

As stated earlier herein, the backwash water volume is between 15 and 60 gallons, the exact volume determined by the treatment facilities supplying influent to the filter system and by the backwash effluent receiving facility. For example, if the backwash effluent is introduced to a primary settling tank, a small volume (15 to 25 gallons, or 2–4 percent of daily effluent) of backwash water must be employed to prevent hydraulic shock loading to the treatment system.

Figure 3:
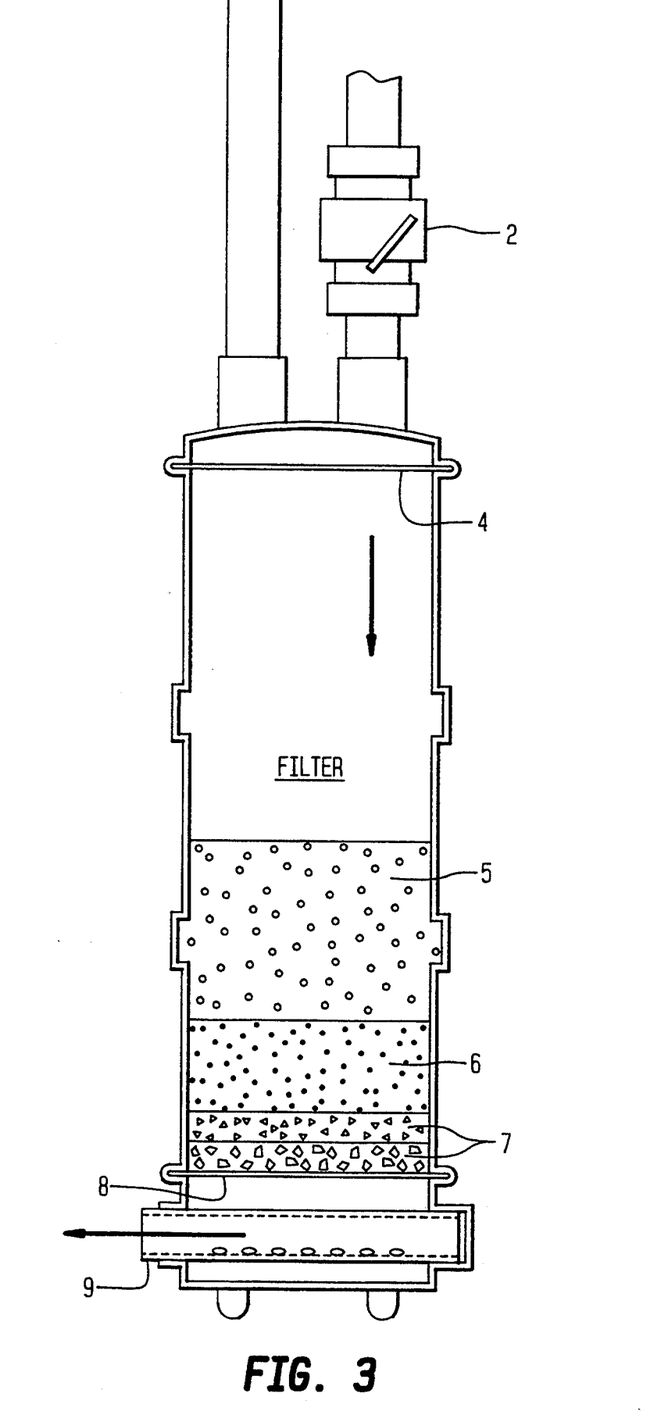
FIG. 3 is a schematic view of a tri-media filter in operation, such as may suitably be used in the practice of the present invention.
Figure 7:
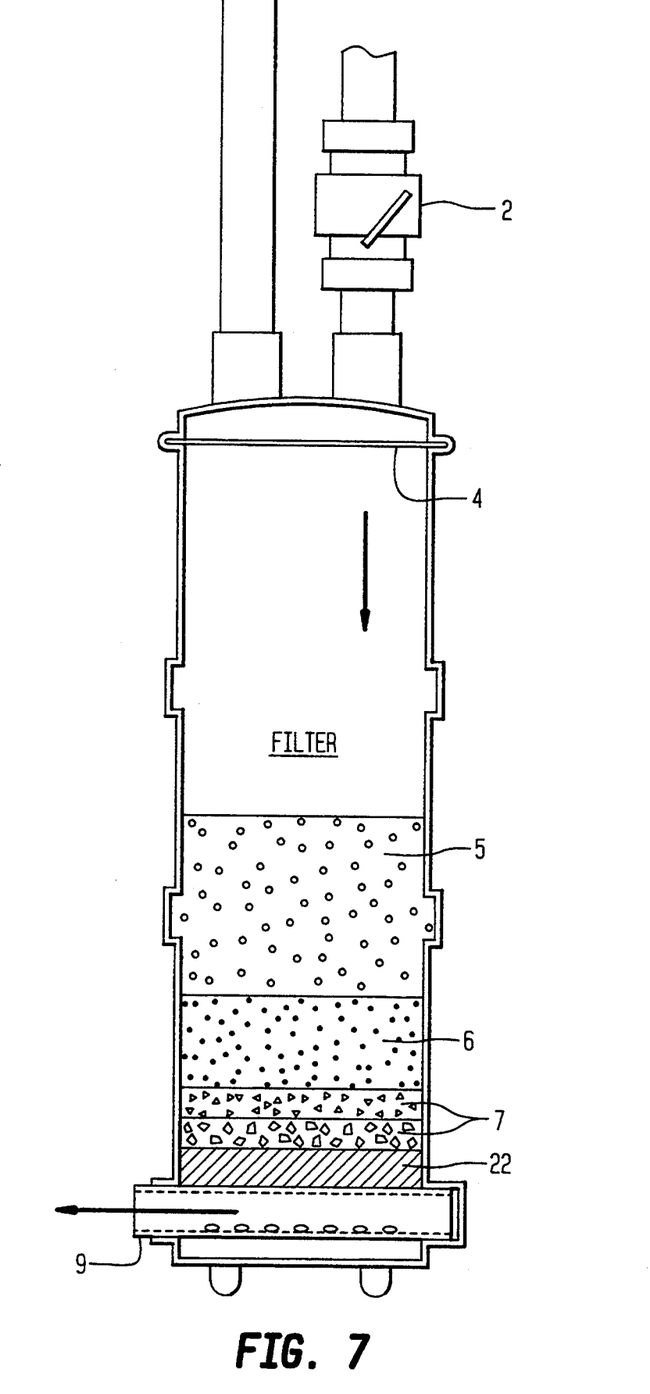
FIG. 7 is a schematic view of a tri-media filter in operation, with the bottom screen replaced by a filtration brick.

The filter vessel 3 will now be described in detail. During the filtration step, as shown in FIG. 3, the liquid containing SS and BOD is flowed through the top screen 4, anti-electrostatic granular plastic media layer 5, sand layer 6, garnet layer 7 (optional), bottom screen 8, and collection and distribution pipe 9, before passing on to the previously described effluent line 10 having a small hole 11 in the top pipe and backwash pump 12 and being discharged through the tank outlet 14. As previously noted, bottom screen may be replaced by a filtration brick 22, as shown in FIG. 7. The granules of the plastic media layer 5 are larger in dimension than are the grains composing the sand layer 6. As a result, the large size sludge particles are removed at the top of the granular plastic media layer 5, the medium size sludge particles are accumulated in the granular plastic media layer 5, and the small size sludge particles are strained at the top of the sand layer 6 and the garnet layer 7. The effluent from the filter is passed to receiving waters of other treatment facilities, or is made available for other uses.

As shown in FIG. 3, the garnet layer 7 is actually two layers of garnet in the preferred embodiment. The lower layer of garnet is composed of large sized garnet pieces, the upper layer of smaller sized garnet particles. The lower layer rests directly on the bottom screen 8 and supports the other filter media. The bottom screen 8 functions as a support for all the filter media. The larger sized garnet particles will not impede fluid flow through the bottom screen 8.

Figure 8:
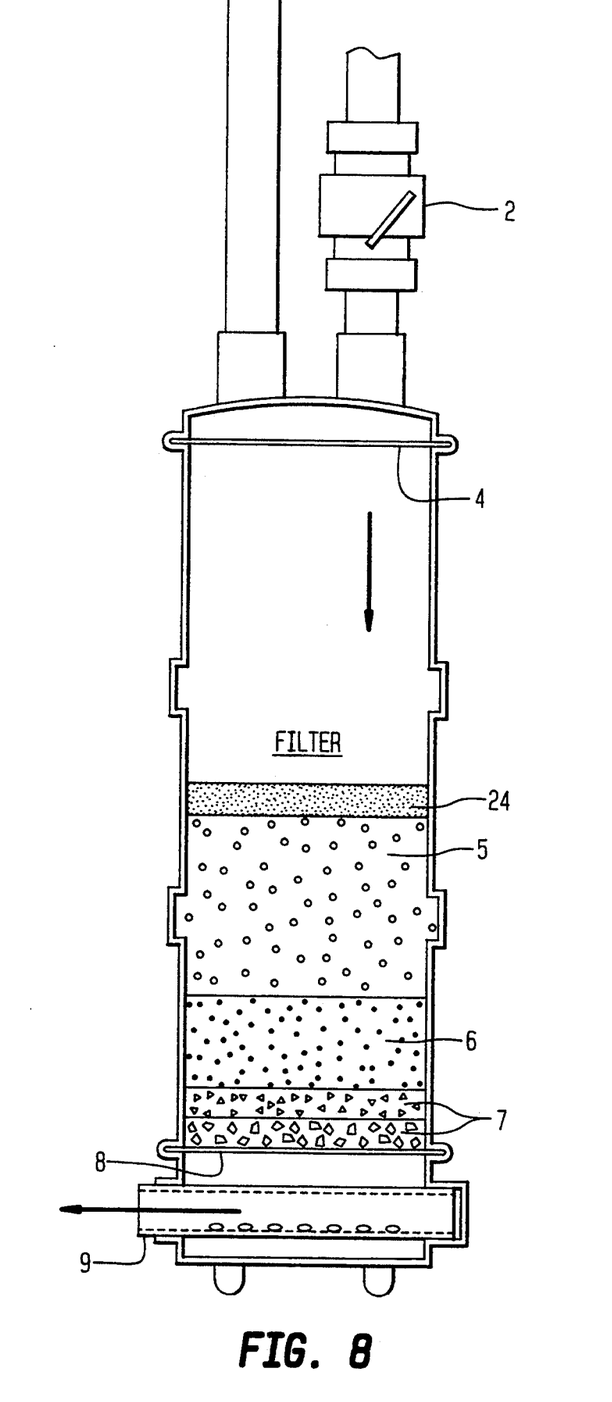
FIG. 8 is a schematic view of a tri-media filter in operation, after a sludge cake has formed at the top of the filtration media.

The previously described filtration process is continued until a "sludge cake" 24 is formed at the top of granular plastic media layer 5, as shown in FIG. 8. After this time, most SS particles in the influent liquid are strained at the top of the cake, whereupon the filtration head loss is gradually raised and the filtration bed is ready for backwashing.

To ensure that the filter media utilized in the present invention return to their original orientation after the backwash process, the granules composing the plastic media layer 5 have a specific gravity that is lower than that of the smaller grains of the sand layer 6. Likewise, the specific gravity of the pieces making up the garnet layer 7 is higher than that of the grains in the sand layer 6. Thus, the layers settle in the proper order after backwash, that is, garnet layer 7 on the bottom, sand layer 6 in the middle, and plastic media layer 5 on top. In the preferred embodiment, in which the garnet layer 7 is composed of two different sizes of garnet pieces, the smaller sized garnet pieces settle atop the larger sized garnet pieces.

The anti-electrostatic granular particles used in the filtration bed of the present invention may be any suitable granular plastic particles which do not experience electrostatic attraction during a pump backwash. It has been found that many different types of plastic particles have electrostatic properties during backwash which affect backwash and media renewal efficiencies and filter operation life.

The anti-electrostatic granular plastic particles employed in the present invention have a uniform particle size. This quality is important to avoid having finer plastic granules rise to the top of the granular plastic media layer 5 after backwashing, reducing the filtration effectiveness of this layer. The shape of the particles may be spherical, cube shaped, shaped in a pillar form, pelletized, or any shape that may be obtained by physically cutting a body of plastic wire into small size particles. Suitable glass-filled nylon pellets which have been tested successfully have a specific gravity of 1.3, less than that of the sand, which in turn has a lower specific gravity than the garnet. The combination of uniform size and shape chosen must allow the plastic particles to be suitably strong, that is, to have a suitable high capacity for solids loading and allow for low filtration head loss during the filtration step. The size of the media used is also determined by the effluent quality limits desired for the filter. Smaller media will filter more SS. The depth of each media layer is chosen based on the desired fluid flow rate; deeper media layers will slow the flow rate.

Figure 4:
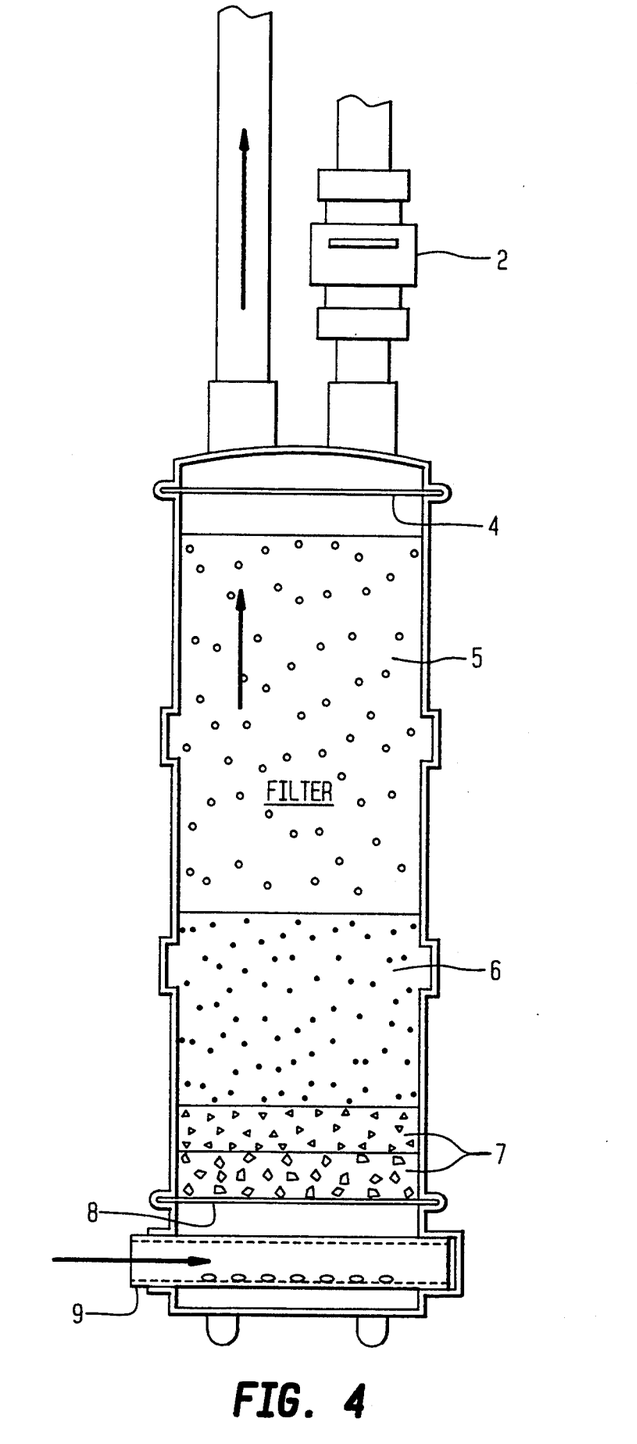
FIG. 4 is a schematic view of a tri-media filter during the backwashing process, such as may suitably be used in the practice of the present invention.
Figure 5:
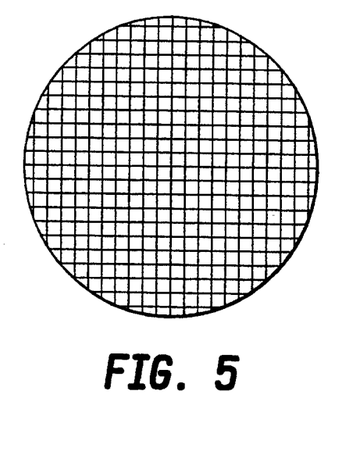
FIG. 5 is a plan view of screens employed in filters of this invention.

During the backwash process, as shown in FIG. 4, the liquid is flowed through effluent line 10 and into collection and distribution pipe 9. The collection and distribution pipe 9 is a hollow pipe preferably perforated with a number of holes, preferably two rows of six holes each, facing the bottom of the filter. One end of the collection and distribution pipe 9 is connected to the effluent line 10 and the other end, if the collection and distribution pipe 9 is perforated, is closed. The diameter of the holes is preferably about $\frac{3}{8}$ inch. The holes cause the backwash water to be distributed uniformly into the filtration bed, making the backwash process more efficient. During normal filter operation, the holes also provide an even distribution of effluent and help maintain effluent flow rate control. The backwash velocity employed in the preferred embodiment of the present invention is between 40 and 65 gal./min./ft.$^2$. The backwash water passes through bottom screen 8, garnet layer 7, sand layer 6, granular plastic particle layer 5 and top screen 4. The filtration media is fluidized between two screens. A plan view of such a screen is shown in FIG. 5. The bottom screen 8 may be made from stainless steel, plastic, or any other rigid, non-corrodible material. Alternatively, the bottom screen 8 may be replaced by any other porous support means for the filtration media, particularly in larger filters. An example of such an alternative support means is a filtration brick. The particular filter brick used must allow backwash water to pass through during the backwash process.

The fluidization rate of the plastic media is between 50 and 100 percent, which creates a high backwash velocity to wash out the sludge cake and other accumulated sludge present in the filtration bed in a short time. The fluidization rate of the optional garnet layer is low. This layer, which, as previously noted, may include garnet particles of two different sizes, is employed for the purpose of maintaining proper backwash water distribution.

Backwash frequency is determined by suspended solids concentration in the influent liquid and by the volume of backwash water. In conventional filter operation, backwash velocity is between 20 and 30 gal./ft.$^2$/min. for a dual-media (anthracite and sand) or a tri-media (anthracite, sand and garnet) filter. The backwash velocity employed in the present invention is between 40 and 65 gal./ft$^2$/min., which is about 100 percent stronger than the conventional velocity. The wear-out rates of the plastic particles, sand, and garnet are low under high backwash velocity using the filter of the present invention allowing the higher rate to be used. The strong backwash current shearing force created by high backwash velocity washes the sludge cake and other accumulated sludge out of the filter vessel in a short time. The sludge in the filter vessel 3 is pushed to the top by a plug flow adjusted by the collection and distribution pipe 9, bottom screen 8 and garnet layer 7. Most of the sludge in the filter vessel 3 is pushed out of the filtration bed at the beginning of the backwash step. Because of high backwash velocity, only a short backwash time is required. The entire backwash period takes only between 0.8 and 3 minutes, which is much shorter than the time necessary for backwash in conventional filtration systems. The backwash frequency described earlier must be determined by evaluating the influent suspended solids concentration and hydraulic loading in the settling tank. The actual backwash frequency chosen depends on the desired effluent quality, head loss, and other individual circumstances and is not a result of the configuration of the filter of the present invention. In the present invention, the backwash frequency is controlled automatically by cycle timer 16 or by a float switch.

In a conventional filter system, where at least two filter media are utilized, backwash time usually takes between 5 and 10 minutes. In such multi-media filters, the backwash effluent will not cause hydraulic shock loading in the treatment plant. In home treatment plants and small commercial treatment plants, however, only one filter is usually employed in the treatment system. A backwash of long duration in the case of home treatment plants will cause hydraulic shock loading, which affects the overall treatment efficiencies of the system. In the present invention, a short backwash time, more frequent backwashing, and higher backwash velocity are used to prevent hydraulic shock loading and sludge clogging in the filtration bed.

Once the optimum backwash frequency is decided, the filter of the present invention can be automatically operated for a long period of time. For example, a filter constructed according to this invention has been tested in the test field of NSF International for over six months. The performance of the filter is satisfactory and will be discussed in examples later.

It was stated earlier herein that the fluidization rate of the granular plastic media is between 50 and 100 percent. This high fluidization rate pushes the sludge particles out of the filter vessel in a short time, usually in 5 to 10 seconds. Because the structure of the plastic media is much stronger than that of the anthracite particles used in traditional dual-media filters, the plastic media will last a long period of time in the filter of the present invention without any plastic particle loss. During the backwashing process, plastic particles are worn out very slowly even by violent mechanical rubbing. The plastic particles always keep their granular form and will not be broken into small pieces as anthracite particles are under similar conditions. Although anti-electrostatic plastic media is more expensive than anthracite filtration media, considering media life and loss problems, the average daily cost of plastic media may actually be less than the cost of anthracite media. Also, the anthracite media cannot be operated at all under high fluidization rate conditions, otherwise the media will be totally lost very quickly.

The sand employed in the filter of this invention preferably has a larger diameter (on the order of 2 to 4 mm) than the sand used in conventional dual-media and multi-media filters (0.4 to 0.8 mm). The fluidization rate of sand during backwashing is between 10 and 20 percent. No sand loss problem has ever occurred during research testing of the present invention.

It is stated earlier herein that backwashing frequency can be controlled by a cycle timer or float switch. If a cycle timer is employed in the filter system, the backwashes must be set at low hydraulic loading periods, such as after 9:00 a.m., after 2:00 p.m. and after 8:00 p.m. If a float switch is used in the system, the goal filtration head loss must be determined before the installation of the filter system. The head loss or filtration head may be determined according to the standard design values for a treatment plant or by referring to other available filter drop values. Using a float switch, the backwash is controlled by a predetermined top flow line at which the filtration process will be terminated and the backwash process will begin. A disadvantage of float switch controlled backwashing is that the backwash may commence at any time that the flow line raises up to the top level. If the backwash steps are started during a peak flow period, hydraulic shock loading will be caused by adding backwash effluent into the treatment system.

The advantages of the present invention are illustrated in the following example:

EXAMPLE

Figure 6:
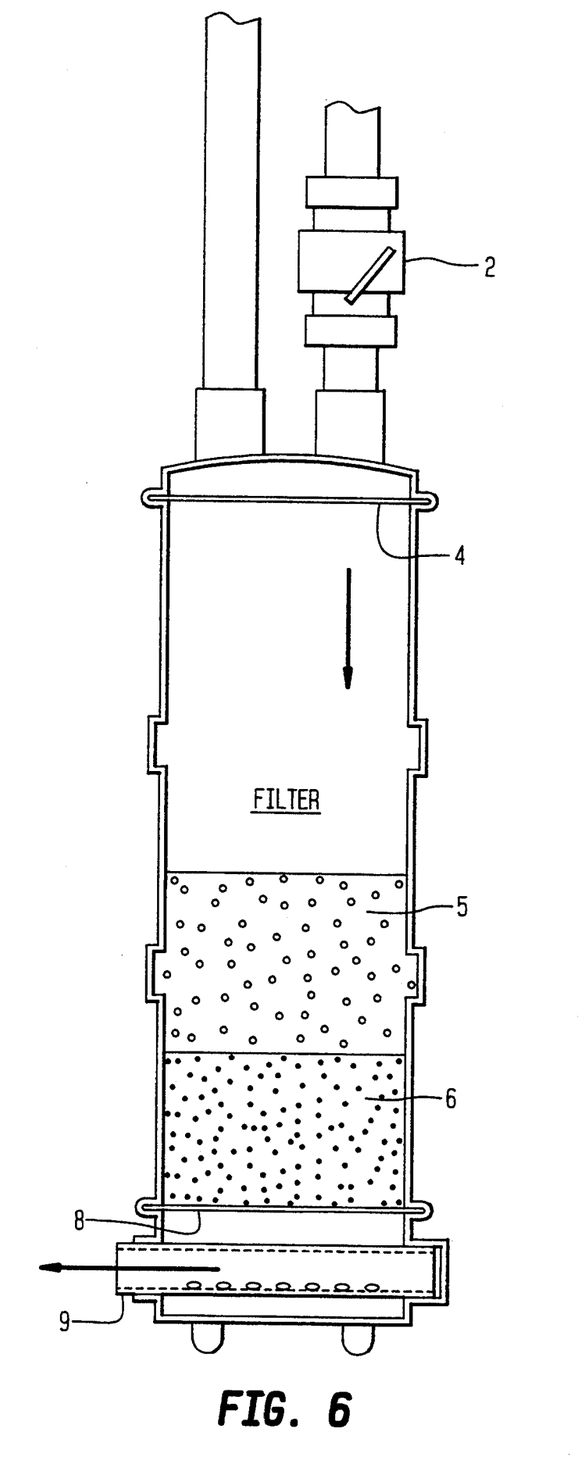
FIG. 6 is a schematic view of a dual-media filter in operation, such as may suitably be used in the practice of the present invention.

A performance evaluation of filters constructed according to the present invention was carried out at the Michigan test site of NSF International. Tests of a tri-media filter, filter I (FIG. 3), and a dual media filter, filter II (FIG. 6) were conducted in two wastewater treatment plants by NSF agents. Filter II is the same as filter I, minus the optional garnet layer 7. Sand was layered to a greater depth in filter II than it was in filter I, in order to compensate for the missing garnet filtering capability.

Filter I was installed to treat effluent from an activated sludge treatment plant and filter II to treat effluent from a submerged biofilm treatment plant. The configuration of these two filters is shown in Table 1. The operating conditions of both filters are listed in Table 2.

TABLE 1

| | | | Configuration of the Filters | | | | | |
|---|---|---|---|---|---|---|---|---|
| | | | GRANULAR PLASTIC | | SAND | | GARNET | |
| FILTER NUMBER | HEIGHT (Inches) | DIA. (Inches) | SIZE (mm) | DEPTH (Inches) | SIZE (mm) | DEPTH (Inches) | SIZE (mm) | DEPTH (Inches) |
| I | 28 | 8 | 2 × 3 × 3 cubic | 5 | 1.2-2 | 3 | 1.5-2.5 2.5-3.5 | 1.5 1.5 |
| II | 24 | 8 | D = 3.25 L = 3.0 pellet | 5 | 2-4 | 6 | N/A | N/A |

TABLE 2

| | | | Operating Conditions of the Filters | | | | |
|---|---|---|---|---|---|---|---|
| FILTER NUMBER | DAILY FLOW (GPD) | PEAK FLOW (GPH) | FILTRATION VELOCITY AT PEAK FLOW (gal./min./ft.²) | BACKWASH VELOCITY (gal./min./ft.²) | BACKWASH TIME (min.) | CONTROL METHOD | MAXIMUM FILTRATION HEAD (inches) |
| I | 500 | 100 | 4.8 | 43.0 | 1 | Timer | 24 |
| II | 500 | 100 | 4.8 | 51.6 | 0.83 | Timer | 22 |

The volume of backwash water was 15 gallons per backwash. The backwash water was returned to the primary settling tank through backwash effluent line 15.

Summary performance data for filters I and II are shown below in Table 3. The discharge requirement of the effluent are 30 mg/liter maximum for both $BOD_5$ and SS (Class I discharge standard).

TABLE 3

| FILTER | Summary Data of the Filter Test | | | | | |
|---|---|---|---|---|---|---|
| | S.S. (mg/l) | | | $BOD_5$ (mg/l) | | |
| NUMBER | INFLUENT | EFFLUENT | REMOVAL (%) | INFLUENT | EFFLUENT | REMOVAL (%) |
| I | 42 | 13 | 69.0 | 39 | 25 | 35.9 |
| II | 12.5 | 8.8 | 29.6 | 14.1 | 9.9 | 29.8 |

The summary data of influent and effluent using filter I show that the Class I effluent quality can be achieved by filtration using the present invention. Although the filter influent of filter II had already achieved Class I requirements, 29.8 percent of $BOD_5$ and 29.6 percent of SS were removed using the dual-media filter of the present invention. Thus, an even better effluent quality was obtained. Filter I and II were successfully tested for more than six months without any maintenance or manual operation.

The dimensions of the present invention may be changed to suit a particular application. For example, the size of the filter vessel 3 may be enlarged to any size to accommodate industrial wastewater recycling or for use in potable water applications. The size of the filtration media used can also be adjusted to achieve certified effluent quality based on the influent quality and the desired discharge standards.

Preferred and alternate embodiments of the present invention have now been described in detail. It is to be noted, however, that this description is merely illustrative of the principles underlying the inventive concept. It is therefore contemplated that various modifications of the disclosed embodiments will, without departing from the spirit and scope of the present invention, be apparent to persons skilled in the art.

What is claimed is:

1. A filtration system for the removal of suspended solids and biochemical oxygen demand from a fluid, comprising:

(a) a first container means having a hollow inside area;

(b) an influent line having an interface with the first container means and providing a passage for fluid to the inside area of the first container means from outside the first container means;

(c) a first effluent line having an inner end, an outer end, a hollow inside surface, and an outside surface and further having an interface with the first container means at the inner end of the first effluent line, the first effluent line providing a passage for fluid from the inside area of the first container means to outside the first container means, the first effluent line further comprising a fluid passage means for allowing the passing of fluid between the hollow inside surface of the first effluent line and the outside surface of the first effluent line;

(d) filtration media, located inside the first container means, for the removal of suspended solids from fluid in the first container means;

(e) a top screen located in the inside area of the first container means between the influent line and the filtration media (f) filtration media support means for supporting the filtration media, located inside the first container means between the filtration media and the first effluent line;

(g) a second effluent line having an interface with the first container means and providing a passage for fluid from the inside area of the first container means to outside the first container means, the top screen being located between the second effluent line and the filtration media; and (h) a backwash pump for sending fluid into the first container means through the first effluent line at a controlled speed when operated, the backwash pump being connected to the first effluent line at the outer end of the first effluent line, said first effluent line including an anti-syphon hole for keeping said filtration media submerged under liquid.

2. The filtration system of claim 1, wherein the influent line further has a check valve for preventing the flow of fluid through the influent line from the inside area of the first container means to outside the first container means.

3. The filtration system of claim 1, wherein the filtration media support means is a bottom screen.

4. The filtration system of claim 1, wherein the filtration media support means is a filtration brick.

5. The filtration system of claim 1, wherein the interface between the first effluent line and the first container means is a hollow pipe having a first end and a second end, the hollow pipe being located within the first container means, and the hollow pipe being connected to the first effluent line at the first end.

6. The filtration system of claim 5, wherein the hollow pipe is closed at the second end and is perforated with a plurality of holes.

7. The filtration system of claim 1, wherein the filtration media comprises:

(a) anti-electrostatic plastic granules having a size and a specific gravity; and (b) sand particles having a size and a specific gravity.

8. The filtration system of claim 7, wherein all the plastic granules are larger in dimension than any of the sand particles, and the specific gravity of the sand particles is greater than the specific gravity of the plastic granules.

9. The filtration system of claim 8, wherein the plastic granules have a specific gravity of about 1.3.

10. The filtration system of claim 8, wherein the size of the plastic granules ranges from about 2 millimeters to about 4 millimeters.

11. The filtration system of claim 8, wherein the size of the sand particles ranges from about 1.2 millimeters to about 3.5 millimeters.

12. The filtration system of claim 8, wherein the filter media further comprises garnet particles having a specific gravity that is greater than the specific gravity of the sand particles.

13. The filtration system of claim 12, wherein the plastic granules are of a uniform size.

14. The filtration system of claim 12, wherein the garnet particles comprise a first group of garnet particles having a first size and a second group of garnet particles having a second size, the second size being larger in dimension than the first size.

15. The filtration system of claim 14, wherein the first size of the garnet particles ranges from about 1.5 millimeters to about 2.5 millimeters and the second size of the garnet particles ranges from about 2.5 millimeters to about 3.5 millimeters.

16. The filtration system of claim 7, wherein the plastic granules are of a uniform size.

17. The filtration system of claim 7, wherein the filtration media further comprises activated sludge particles.

18. The filtration system of claim 17, wherein the activated sludge particles form a cake at the top of the anti-electrostatic plastic granules.

19. The filtration system of claim 1 wherein the backwash pump is located within a second container means separate from the first container means having a hollow inside area and an outlet port.

20. The filtration system of claim 1 wherein the first container means and the first effluent means are located within the second container means.

21. The filtration system of claim 1, further comprising automatic control means for actuating the backwash pump.

22. The filtration system of claim 21, wherein the automatic control means is a cycle timer.

23. The filtration system of claim 21, wherein the automatic control means is a float switch.

24. The filtration system of claim 1, wherein the controlled speed at which the backwash pump sends fluid into the first container means ranges from about 40 gallons per square foot per minute to about 65 gallons per square foot per minute.

25. A filtration system for the removal of suspended solids and biochemical oxygen demand from a fluid, comprising:

(a) a first container means having a hollow inside area;

(b) an influent line having an interface with the first container means and providing a passage for fluid to the inside area of the first container means from outside the first container means and further having a check valve for preventing the flow of fluid through the influent line from the inside area of the first container means to outside the first container means;

(c) a first effluent line having an inner end, an outer end, a hollow inside surface, and an outside surface and further having an interface with the first container means at the inner end of the first effluent line, the first effluent line providing a passage for fluid from the inside area of the first container means to outside the first container means;

(d) filtration media, located inside the first container means, for the removal of suspended solids from fluid in the first container means;

(e) a top screen located in the inside area of the first container means between the influent line and the filtration media; and (f) filtration media support means for supporting the filtration media, located inside the first container means between the filtration media and the first effluent line, said first effluent line including an anti-syphon hole for keeping said filtration media submerged under liquid, the filtration media comprising:

(i) anti-electrostatic plastic granules having a specific gravity;

(ii) sand particles having a specific gravity; and (iii) garnet particles having a specific gravity;

(iv) all the plastic granules being larger in dimension than any of the sand particles, the specific gravity of the sand particles being greater than the specific gravity of the plastic granules, and the garnet particles having a specific gravity that is greater than the specific gravity of the sand particles; and (v) wherein the plastic granules are of a uniform size.

26. The filtration system of claim 25, wherein the plastic granules have a specific gravity of about 1.3.

27. The filtration system of claim 25, wherein the size of the plastic granules ranges from about 2 millimeters to about 4 millimeters.

28. The filtration system of claim 25, wherein the size of the sand particles ranges from about 1.2 millimeters to about 3.5 millimeters.

29. The filtration system of claim 25, wherein the garnet particles comprise a first group of garnet particles having a first size and a second group of garnet particles having a second size, the second size being larger in dimension than the first size.

30. The filtration system of claim 29, wherein the first size of the garnet particles ranges from about 1.5 millimeters to about 2.5 millimeters and the second size of the garnet particles ranges from about 2.5 millimeters to about 3.5 millimeters.

31. The filtration system of claim 25, wherein the filtration media support means is a bottom screen.

32. The filtration system of claim 25, wherein the filtration media support means is a filtration brick.

33. The filtration system of claim 25, wherein the interface between the first effluent line and the first container means is a hollow pipe having a first end and a second end, located within the first container means, the pipe being connected to the first effluent line at the first end.

34. The filtration system of claim 33, wherein the hollow pipe is closed at the second end and is perforated with a plurality of holes.

35. The filtration system of claim 25, further comprising a backwash pump for sending fluid into the first container means through the first effluent line when operated, the backwash pump being connected to the first effluent line at the outer end of the first effluent line;

the filtration system further comprising a second effluent line having an interface with the first container means and providing a passage for fluid from the inside area of the first container means to outside the first container means, the top screen being located between the second effluent line and the filtration media;

the first effluent line further comprising a fluid passage means for allowing the passing of fluid between the hollow inside surface of the first effluent line and the outside surface of the first effluent line;

the backwash pump being located within a second container means having a hollow inside area and an outlet port;

the filtration system further comprising automatic control means for actuating the backwash pump; and the automatic control means being selected from the group of control means consisting of cycle timer and float switches.

36. The filtration system of claim 35, wherein the first container means and the first effluent means are located within the second container means.

37. The filtration system of claim 25, wherein the filtration media further comprises activated sludge particles.

38. The filtration system of claim 37, wherein the activated sludge particles form a cake at the top of the anti-electrostatic plastic granules.

* * * * *